United States Patent [19]

Kaufmann et al.

[11] Patent Number: 4,929,413

[45] Date of Patent: May 29, 1990

[54] TELEVISION ALIGNMENT OF MAST ASSEMBLY IN REFUELING OF NUCLEAR REACTOR

[75] Inventors: John W. Kaufmann, Murrysville; Kenneth J. Swidwa, Harmar Township, Allegheny County; Leonard P. Hornak, North Huntingdon, all of Pa.

[73] Assignee: Westinghouse Electric Corp., Pittsburgh, Pa.

[21] Appl. No.: 234,114

[22] Filed: Aug. 19, 1988

Related U.S. Application Data

[62] Division of Ser. No. 382,269, May 26, 1982, Pat. No. 4,832,902.

[51] Int. Cl.⁵ ............................................. G21C 19/10
[52] U.S. Cl. ................................... 376/268; 376/248
[58] Field of Search ............... 376/248, 258, 264, 268, 376/271; 358/100; 294/906

[56] References Cited

U.S. PATENT DOCUMENTS

| | | | |
|---|---|---|---|
| 3,077,361 | 2/1963 | Tait et al. | 358/100 |
| 4,374,801 | 2/1983 | Albin | 376/271 |
| 4,482,520 | 11/1984 | Randazza | 376/248 |

FOREIGN PATENT DOCUMENTS 0780566  3/1968  Canada ............................. 376/248

*Primary Examiner*—Daniel Wasil
*Attorney, Agent, or Firm*—H. Diamond

[57] ABSTRACT

Refueling apparatus for a nuclear reactor including a bridge and a trolley. The bridge is moveable in tracks along the containment of the pit in which the reactor is immersed in water and the trolley moveable in tracks on the bridge at right angles to the tracks on the bridge. The trolley carries a mast assembly for engaging, raising, and lowering a nuclear-reactor component assembly involved in the refueling. The mast includes an elongated member for engaging control-rod and thimble plug assembly and a gripper for raising fuel assemblies. The elongated member is moveable upwardly or downwardly.

6 Claims, 6 Drawing Sheets

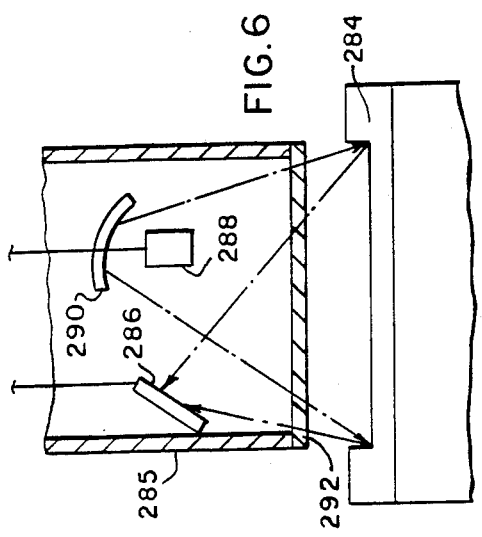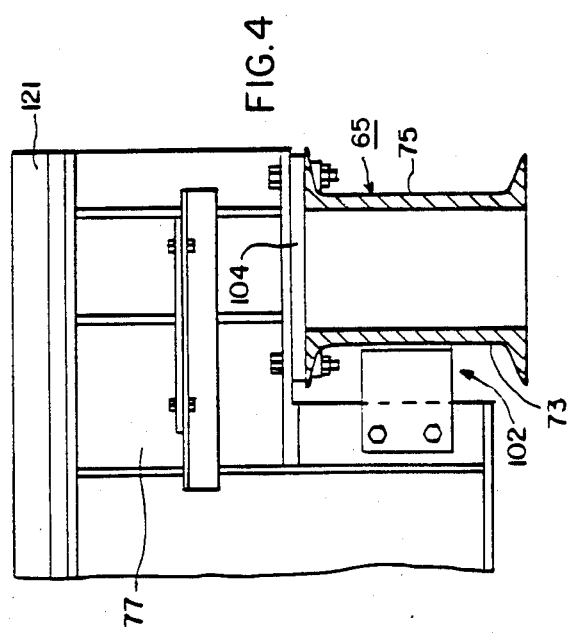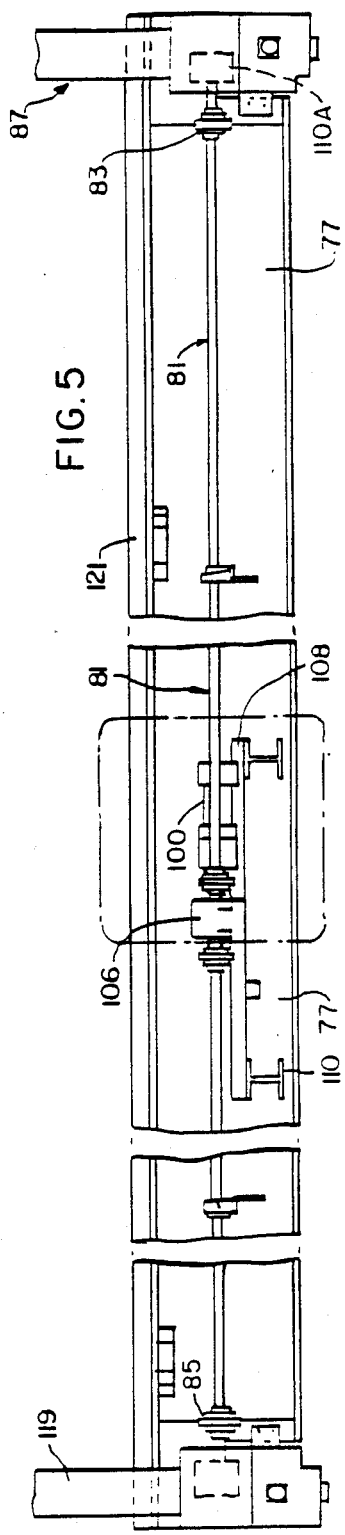

TELEVISION ALIGNMENT OF MAST ASSEMBLY IN REFUELING OF NUCLEAR REACTOR

CROSS-REFERENCE TO RELATED APPLICATION

This application is a division of application Ser. No. 382,269 filed May 26, 1982 for REFUELING OF NUCLEAR REACTOR, now U.S. Pat. No. 4,832,902 granted May 23, 1989 and assigned to Westinghouse Electric Corporation.

BACKGROUND OF THE INVENTION

This invention relates to the art of nuclear reactor power plants. It has particular relationship to the refueling of the reactors of such plants. In carrying out the refueling, the reactor to be refueled is at the base of a pit in a containment filled with water to a depth of 20 or 30 feet. During refueling, component assemblies of the reactor or from refueling racks are engaged by grippers or grapples of a mast assembly, raised, transported from their position of origin and lowered in the position where they are to be deposited. The component assemblies are highly radioactive and are engaged, raised, transported and lowered under a substantial depth of water. To carry out this operation, there is provided apparatus including a bridge moveable along a track on the containment. A trolley is moveable on a track on the bridge. The trolley carries a mast assembly having a rotatable supporting mast from which the component-assembly engaging-raising-and-lowering means is suspended. This means is sometimes herein referred to as "component-assembly handling mechanism" or "assembly-handling mechanism" or simply "mechanism". With the bridge and trolley at selectably different positions along their tracks, the mast assembly is suspended with the assembly-handling mechanisms at selectably different positions of the area of the pit or of the reactor within the pit.

It is indispensable to successful refueling that the mechanism on the mast assembly be positioned during each operation to engage effectively and raise the exact assembly which is selected for transport. Since the reactor is under water, the positioning of the mechanisms and the engagement of the mechanisms with the component assemblies must be carried out with the necessary precision with at best a heavily clouded view of the nuclear core.

In accordance with the teachings of the prior art, index marks were provided on the trolley and bridge to locate the component assemblies to be moved in the reactor core. The index marks served to position the mast assembly over the theoretical location of a component assembly. If the assembly is out of position, difficult visual determinations were required to make the necessary adjustments. This operation was time consuming and required the utmost caution to preclude damage to the component assemblies.

It is the object of this invention to overcome the difficulties and drawbacks of the prior art. An object of this invention is to provide refueling apparatus for a reactor having facilities, whose calibration shall be maintained throughout a refueling operation, for reliably and precisely identifying the position of the mast assembly with reference to the reactor core. It is another object of this invention to provide refueling apparatus which shall not require a long festoon loop in the fluid and electric conductors between the trolley and the rotatable mast and in whose operations these conductors shall not be twisted. A third object of this invention is to provide refueling apparatus in whose operation rotation of the mast assembly shall not be restricted by the fluid and electric conductors and fouling of the hoist cables by these conductors on rotation of the mast assembly relative. The object of this invention is to provide refueling apparatus including position visual facilities for aligning the mast assembly with the component assembly to be transported for identifying and recording the location of component assemblies to be transferred and, if desirable, to provide a permanent record of the refueling and core mapping operation.

In accordance with this invention a television camera and a light source and reflector are mounted on the gripper housing of the mast assembly. The light source and reflector are positioned to illuminate a part of the top, i.e., the upper nozzle, in case of a fuel assembly to be transported or of another component assembly to be transported. The television camera is positioned to pick up an image of this part. The receiver connected to this television camera and the viewing monitor are in the control console. The viewing monitor may be provided with cross hairs which may serve to orient the mast assembly appropriately with reference to the fuel assembly. For example, the mast assembly may be rotated to a position in which the cross hairs pass through the centers of the images of the bolts in a corner of the fuel assembly which support the hold-down springs of the nozzle. The identification and location of the fuel assembly may be recorded in the computer. In addition, a video recorder may be provided. Such a recorder would produce a permanent record of the refueling and core mapping operations.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 4 is a fragmental view in section taken along line IV—IV of FIG. 2 showing the manner in which the channels which form a truck of the bridge support the I-beams of the bridge;

FIG. 5 is a view in side elevation showing the manner in which the I-beam of the bridge supports the motor which drives the driven wheels;

FIG. 6 is a diagram showing the television system for orienting the mast assembly with respect to a nuclear component assembly to be transported;

DETAILED DESCRIPTION OF THE EMBODIMENT

Figure 1:
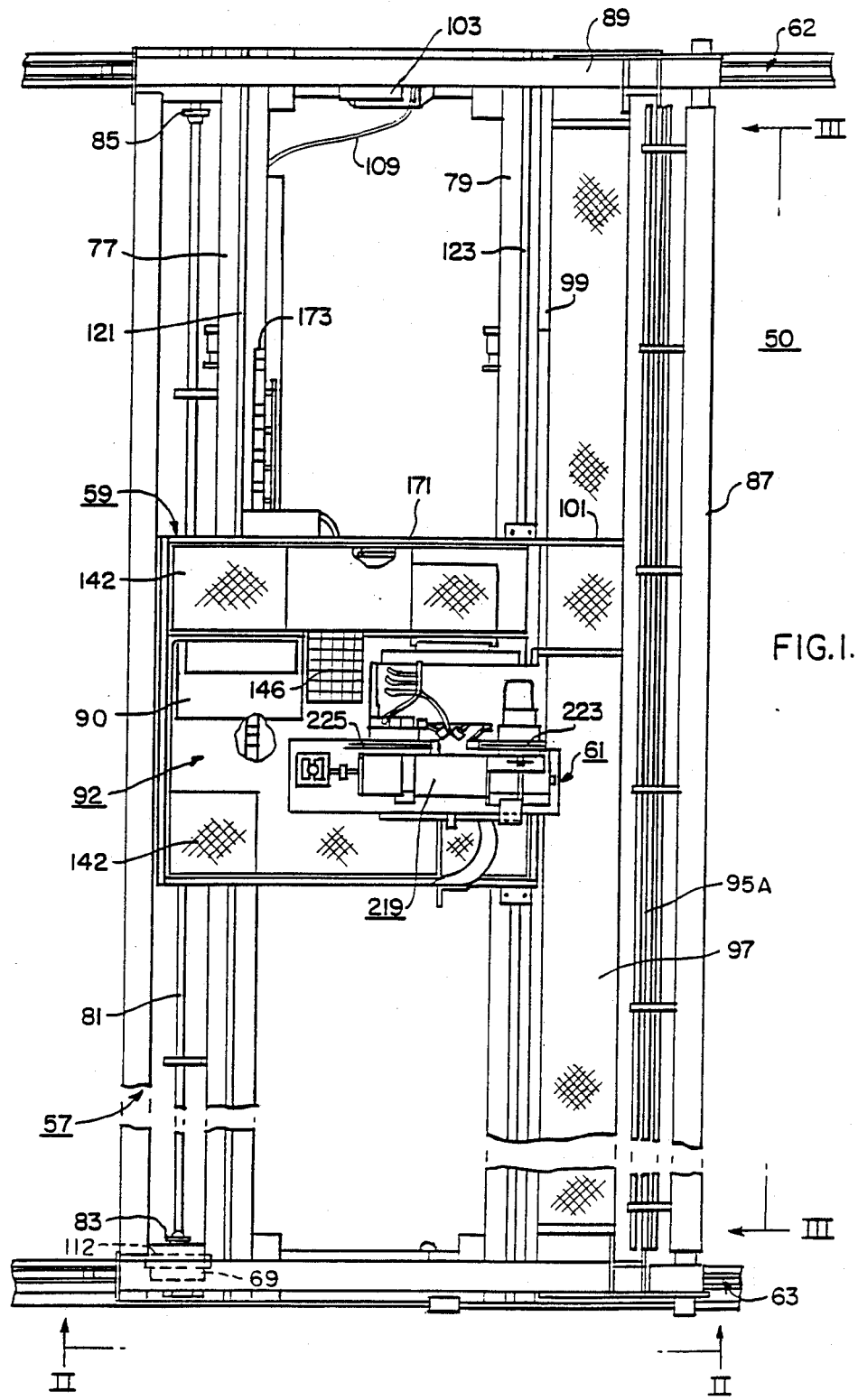
FIG. 1 is a plan view of apparatus in accordance with this invention.

The apparatus 50 for refueling a nuclear reactor shown in the drawings serves to engage selected component assemblies of a nuclear reactor 51 (FIG. 3), raise these components, transport them and lower them into a selected position. The general operation of this apparatus 50 and the purposes which it serves is disclosed in U.S. Pat. No. 4,511,531 granted Apr. 15, 1988 to Swidwa et al. which is incorporated in the parent application by reference. The reactor 51 is disposed under water 53, 20 or 30 feet in depth in a containment defined by massive walls 55.

Figure 2:
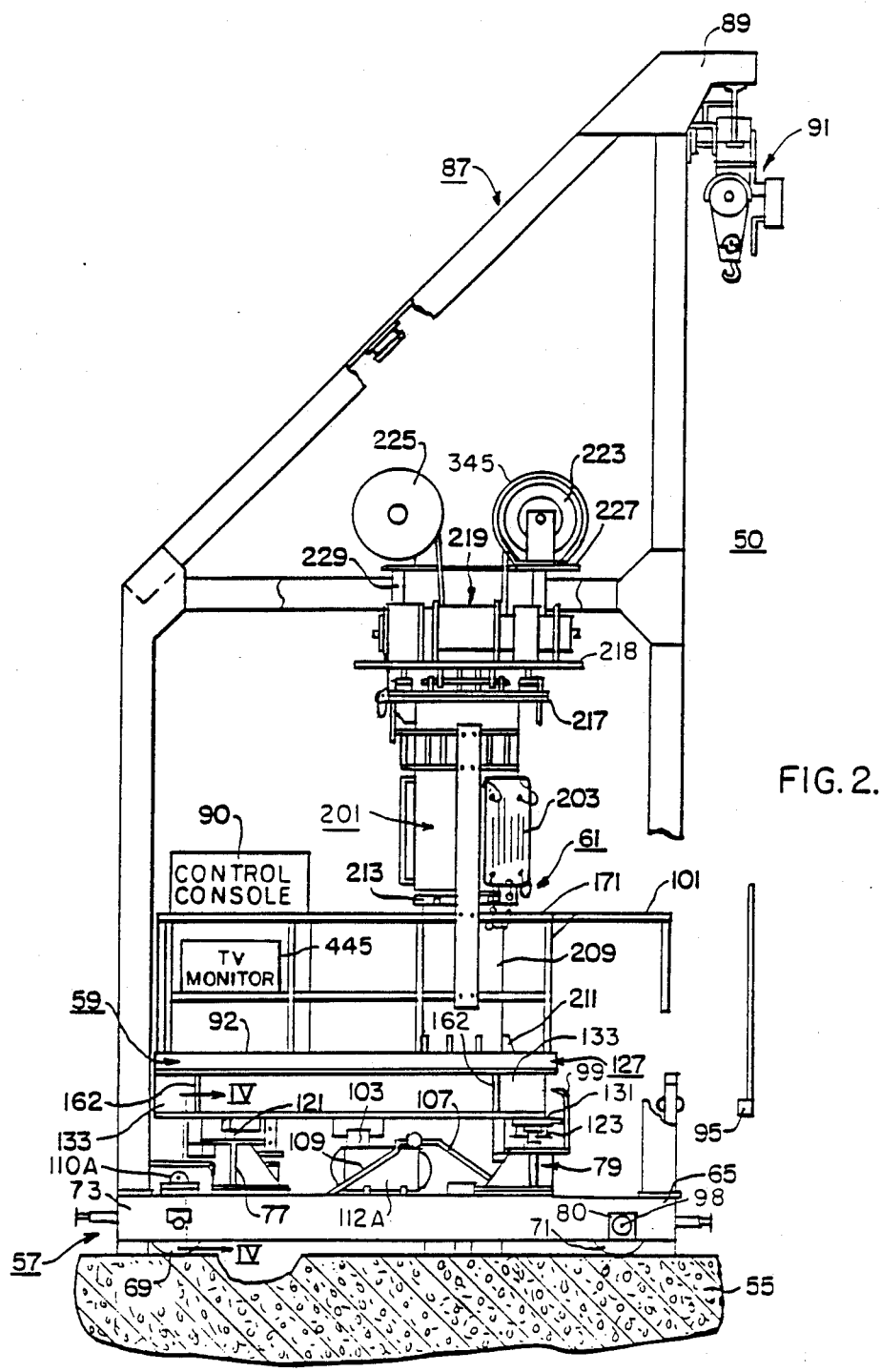
FIG. 2 is a view in end elevation in the direction of the arrows II—II of FIG. 1.
Figure 3:
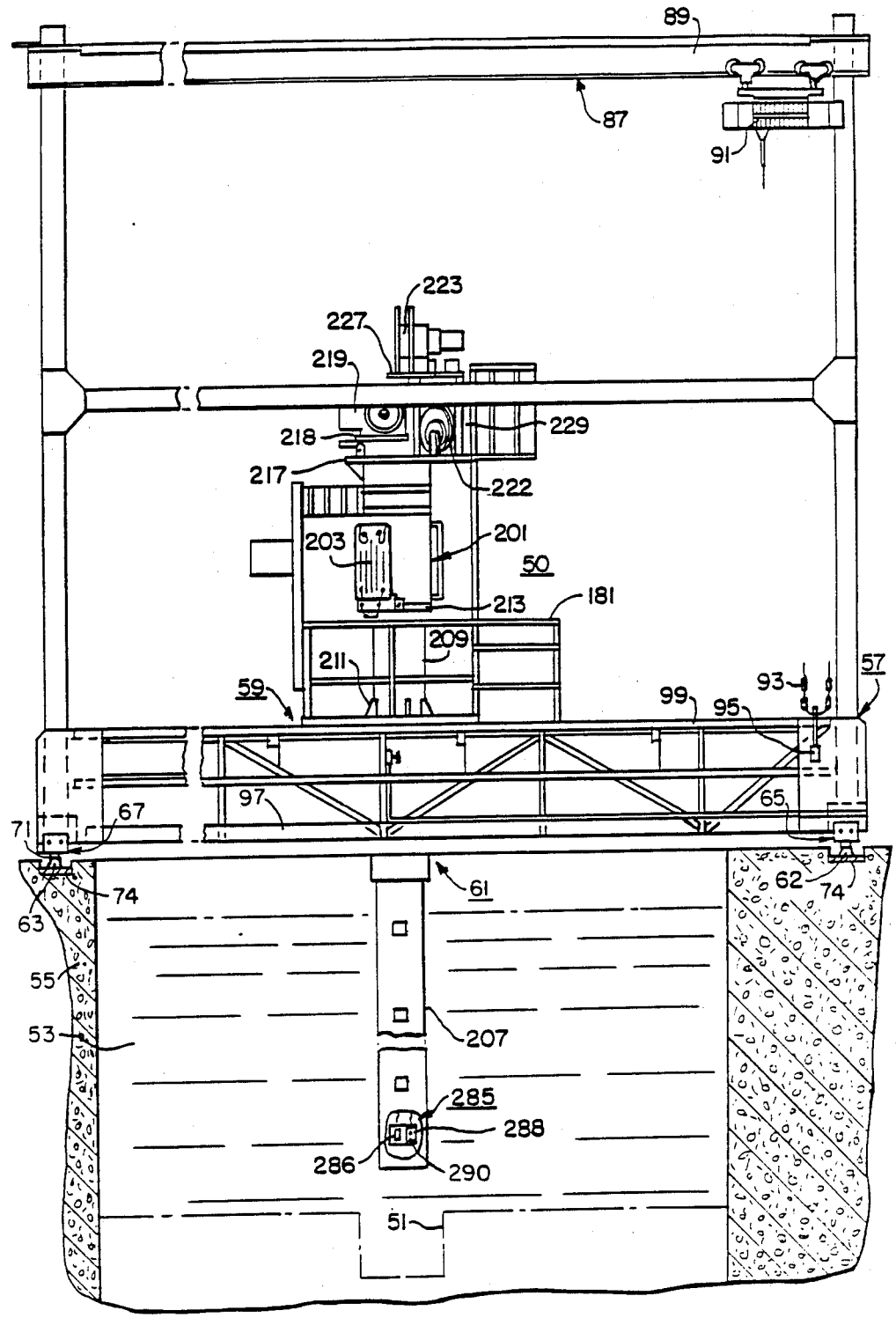
FIG. 3 is a view in side elevation in the direction of the arrows III—III of FIG. 1.

The apparatus 50 includes a bridge 57, a trolley 59 and a mast assembly 61 (FIGS. 1, 2, 3). A control console 90 is mounted on the deck 92 of the trolley 59. The bridge is moveable on rails or tracks 62 and 63 (FIG. 1). These tracks are similar except that track 63 has a position verification cam (not shown).

The bridge 57 includes trucks 65 and 67 (FIGS. 2, 3). Each truck has a driven wheel 69 and an idler wheel 71 on shafts extending between back-to-back channels 73 and 75 (FIG. 4). I-beams 77 and 79 (FIG. 2) interconnect the trucks 65 and 67. I-beam 77 is adjacent the driven wheels 69. The channels 73 and 75 extend through cut-outs 102 of each beam 77 and 79. Plates 104 welded to the webs of the I-beam are bolted to the upper flanges of the channels. FIG. 4 shows this structure for I-beam 77 which is adjacent the driven wheels 69.

The wheels 69 are driven by motor 100 through speed reducer 106 (FIG. 5). The motor 100 and speed reducer 106 are mounted on a bracket 108 welded to the web of I-beam 77 and supported on small I-beams 110 welded to I-beam 77.

The motor 100 drives shaft 81 (FIG. 1, 5) whose sections are connected through couplings 83 and 85 to pinions 110A. Each pinion engages a gear (not shown) on the shaft of driven wheel 69. Wheels 69 are rotatable on sleeve bearings (not shown) on their shafts. Wheels 71 are secured to their shafts 98 (FIG. 2). The shafts 98 are rotatable on bearing cartridges 80 which are journaled in the channels 73 and 75.

A frame-like super structure 87 (FIG. 2) is bolted to the trucks 65 and 67 of the bridge spanning the trucks. The super structure 87 has an overhang 89 at the top which carries a hoist 91 for tools. The hoist 91 may be moved between the opposite walls 55 of the pit by a chain 93 (FIG. 3). It may be operated by a pushbutton switch 95 suspended from the hoist. Power is supplied to the hoist 91 by power track 95A. Some of the tools which are used with hoist 91 are operated by compressed air.

While the fluid for driving the fluid tools and the operable means may be of any type, the fluid typically used in the practice of this invention is compressed air. An assembly including a compressor 103 and a tank 112A and associated switch means and relief valves (FIG. 2) is mounted on truck 65 of the bridge 57 to supply the compressed air. Air may be selectively supplied to the tools on hoist 91 through air hose 107 and by air hose 109 to the trolley 59 for the air-operated devices on the mast 61.

The apparatus 50 is supplied with power from a power outlet (not shown) on the containment through a conductor (not shown). Between the outlet and the bridge 57 the power line includes a plurality of festoon loops (not shown).

The trolley 59 is moveable on tracks or rails 121 and 123 on I-beams 77 and 79. The trolley 59 is moveable along tracks 121 and 123 on a truck and another truck (not shown). Each truck has a driving wheel (not shown) and an idling wheel (not shown). Each pair of wheels is suspended from back-to-back channels 133 (FIG. 2) and another (not shown). Each pair of driven wheels (not shown) is rotatable on sleeve bushings on a shaft supported between a pairs of channels 133 and one (not shown), 133 on the outside and the one (not shown) on the inside.

The channel units 133 and the one (not shown) are strengthened by gussets 162. The supporting structures of the trolley 59 is described with reference to FIGS. 3C and 3D in the parent application.

The bridge 57 is provided with a walkway 97 (FIG. 1) on one side. A safety fence 99 extends along the walkway on the side of the pit. The safety fence 99 has handrails 101 in the center permitting personnel to step safely from the trolley 59 to the walkway. A handrail 171 extends around the trolley deck 92.

The mast assembly 61 includes a supporting mast 201 (FIGS. 2, 3, 7) of circular cross-section. The supporting mast 201 has windows 203 (FIGS. 2, 7) through which the operation of the parts within the mast 201 may be observed. A ring 205 (FIG. 7) from which a long guiding mast 207 of circular section extends is secured to the supporting mast 201. The apparatus also includes an auxiliary mast or bearing mast 209. Brackets 211 extend from the auxiliary mast 209 near its lower end. These brackets engage the bracket pads (not shown) on the deck 92 of the trolley 57. The auxiliary mast 209 has a flange 213 at the top which carries a thrust-bearing ring 215. The ring 205 has a seat for the bearing ring 215. The supporting mast 201 and the ring 205 and guiding mast 207 and other parts supported from the supporting mast are rotatable on the bearings 215.

The supporting mast 201 has a rectangular flange 217 at the top. There are supported directly on this flange 217 a platform 218, on which a winch 219 (FIGS. 7, 2) is mounted. The flange 217 also supports an electric conductor reel (not shown) and an air-hose reel 222. An additional reel 223 for electric conductors and an additional air-hose reel 225 are supported from a platform 227 mounted on legs 229 on flange 217 (FIG. 7).

An elongated member 231 having at its lower end, grapples (not shown) for engaging a control-rod cluster (not shown) or a thimble-plug cluster (not shown) of the reactor 51 to be refueled, are moveable upwardly or downwardly by the winch 219. The elongated member 231 includes a tube 233 (FIG. 7) to the upper end of which a plate 237 is secured. The plate 237 is formed into a rigid mechanical unit with an upper-plate assembly 239 by four support rods 241. The rods 241 engage plate 237, and are secured by nuts to the plate 243 of the upper-plate assembly. The flange of a yoke 247 engages the plate 243 and carries a cylinder 249, typically an air cylinder at its other end. The flange, plate 237 and cylinder 249 are connected together as a rigid unit. The piston rod 251 of cylinder 249 actuates a rod 253 to move upwardly or downwardly in the tube 233. When actuated to its utmost down position, the rod 253 causes the grapple (not shown) to engage the control rod assembly or thimble-plug assembly which is to be raised. In the up position of the rod 253, the grapple may be disengaged from the component assembly. Limit switches (not shown) are provided for signaling that the piston rod 251 is at its extreme positions. The yoke 247 is pivotally connected to the lower junctions of swivels 255. The upper junction of each swivel 255 is pivotally connected to a clevis (not shown). Each clevis 259 is suspended from a threaded member at the end of a cable 261 from the winch 219.

The mast assembly also includes an inner mast or gripper mast 281 having a top plate 287. This mast 281 is of generally rectangular cross section composed of oppositely disposed channels formed into a rigid unit by cross snow-flake plates, as shown in detail in Swidwa. The inner mast carries a gripper assembly 285, (FIG. 3), for engaging a fuel assembly 284. A television camera 286 (FIG. 3), light source 288 and reflector 290 are mounted on the end plate 292 of the gripper assembly. The reflector 290 is so set as to illuminate the region of a component assembly, for example fuel assembly 284 to be viewed by the camera. A television monitor 445 is connected in a closed circuit with the camera 286. The electrical conductors between the monitor 445 and the camera 286 and to the light source 288 are in cables. These cables are connected to the cable reel 223 on the mast assembly 61 and thence to appropriate terminals in console 90 as described in the parent application.

Figure 7:
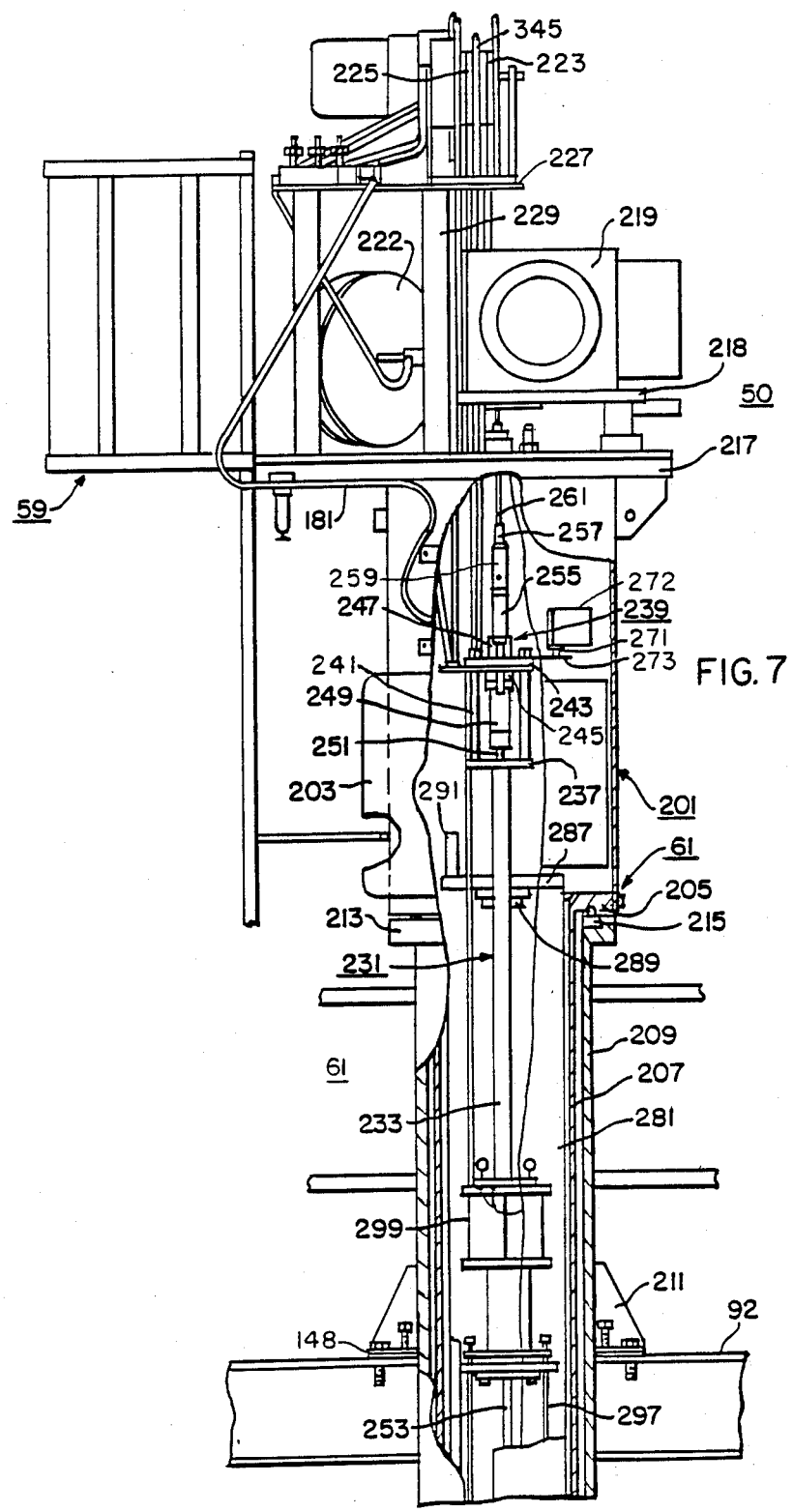
FIG. 7 is a view in side elevation with parts broken away and parts sectioned of the upper part of the mast assembly of apparatus in accordance with this invention showing the limit switch which checks the calibration of the coordinate involved in raising and lowering the component-assembly handling mechanism.
Figure 9:
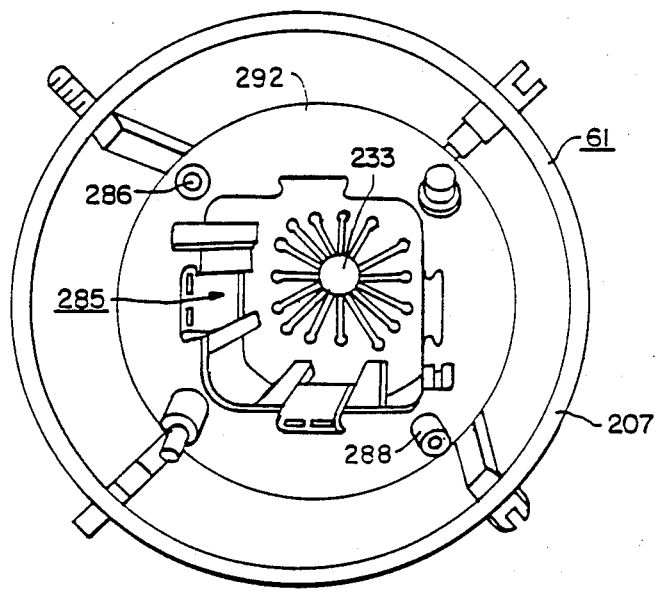
FIG. 9 is a copy of a photograph of the end of the mast assembly showing this television camera and light source.
Figure 8:
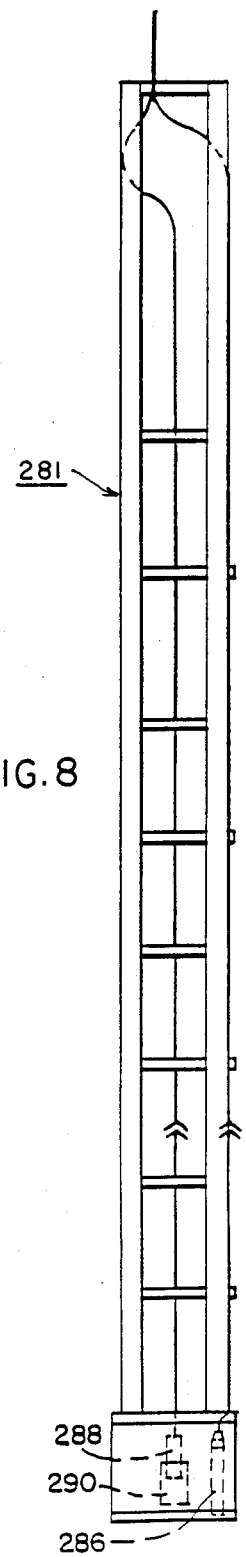
FIG. 8 is a view in side elevation of the inner mast of the mast assembly showing the manner in which the television camera and the light source are positioned on the gripper housing in the practice of this invention.

The gripper assembly 285 is actuable to engage or disengage a fuel assembly by rods 297 (FIG. 7). The rods 297 are moveable upwardly and downwardly by a hollow fluid driven cylinder 299 (FIG. 7) through which the tube 233 passes. The extreme positions of the cylinder 299 are signalled by limit switches (not shown).

Figure 10:
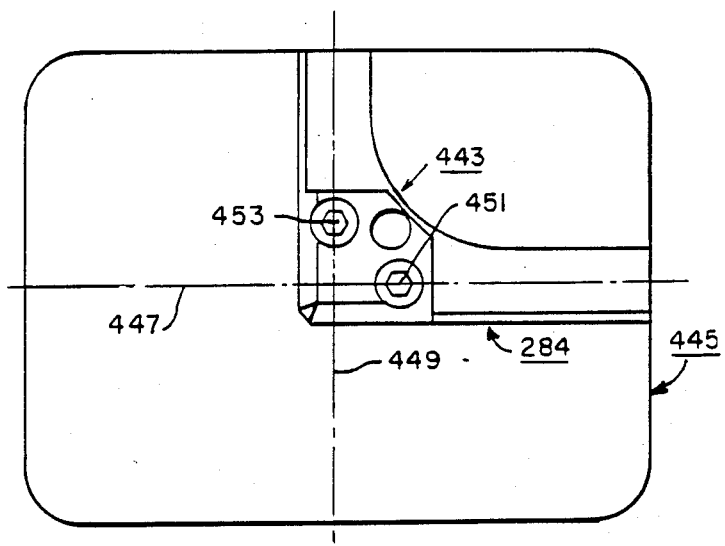
FIG. 10 is a diagram showing the manner in which the mast assembly is oriented by reference to the cross hairs on a television viewer tube in the practice of this invention.

The television camera 286 produces an image 443 of a portion of the fuel assembly 284 on a television monitor 445 (FIG. 10) in the control console 90. The monitor has cross hairs 447 and 449. The moving parts of the mast assembly and the camera are oriented by moving the bridge and/or trolley so that the cross hairs are in a predetermined position with reference to selected parts of the fuel assembly. As shown in FIG. 10, the mast and camera are set so that the images 451 and 453 of the bolts which secure the springs of the upper nozzle are intersected.

While a preferred embodiment of this invention has been disclosed herein, many modifications thereof are feasible. This invention is not to be limited except insofar as is necessitated by the spirit of the prior art.

We claim:

1. Apparatus for refueling a nuclear reactor, said reactor having component assemblies of at least one type and being disposed in a pit in a containment under water, means for raising and lowering said component assemblies of at least one type, said raising-and-lowering means including at one end thereof a mechanism for engaging one of said component assemblies so that it may be raised and lowered, means, supported on said containment, for suspending said raising-and-lowering means in said pit under water with said mechanism extending in said pit from said one end of said raising-and-lowering means in a position where said mechanism can engage one of said component assemblies, said suspending means including positional-adjustment means for said raising-and-lowering means for moving said mechanism to position said mechanism appropriately to engage said one component assembly for raising and lowering, a television camera, a television monitor having a reference indication, means connecting said camera to said monitor in television-image communication relationship, and means mounting said camera on said mechanism, near the end thereof to be positioned near said one component assembly movable with said mechanism and in a position such that when said mechanism is positioned to engage said one component assembly for raising and lowering, said camera transmits for display on said monitor an image of a portion of said one component assembly, said image of said portion including an image of a part of said portion which image of said part lends itself by alignment with said reference indication, to appropriate positioning of said mechanism, as it is moved with said camera, to engage said one component assembly for raising and lowering, whereby by alignment of said indication and the image of said part, said mechanism is positioned appropriately to engage said one component assembly for raising and lowering.

2. The apparatus of claim 1 wherein a source of light is mounted on the mechanism near the end thereof, which is to be positioned near the one component assembly, said source being mounted on said mechanism in a position where it can illuminate the view of the portion of the one component assembly whose image is to be displayed on the monitor.

3. The apparatus of claim 1 wherein the television camera and the television monitor are connected in a closed circuit by electrical conductors interconnecting said camera and said monitor.

4. In the refueling of a nuclear reactor, said reactor having component assemblies of at least one type and being disposed in a pit in a containment under water, said refueling being carried out with means for raising and lowering said component assemblies of at least one type, said raising-and-lowering means including a mechanism movable to be positioned to engage one of said component assemblies so that said one component assembly may be raised and lowered; the method of positioning said mechanism, so to engage said one component assembly; said method including: producing a television image of a portion of said one component assembly on a television monitor with a television camera mounted movable with said mechanism, said television image including an image of a part of said portion, which image of said part lends itself, by alignment with a reference indication in said monitor, to positioning said mechanism to engage said one component assembly as aforesaid, and while viewing said image of said portion moving said mechanism and said camera to align said image of said part with said indication to position said mechanism to engage said one component as aforesaid.

5. The method of claim 4 wherein the part comprises bolt means of the one component assembly and the monitor has crosshairs and the image of the part is aligned by centering the crosshairs on the image of the bolt means.

6. In the refueling of a nuclear reactor having component assemblies of at least one type and being disposed in a pit in a containment under water, said refueling being carried out with a mast movable axially and circumferentially for raising and lowering said component assemblies, a mechanism, connected to an end of said mast, cooperative with said mast, for engaging a component assembly to be raised by said mast, a television camera, and a television monitor having an image-reference indication, said mechanism being connected to said mast movable with said mast; the method of positioning said mechanism to engage said component assembly appropriately for raising and lowering, comprising: mounting said camera on said mechanism movable therewith, suspending said mast in the water of said pit with said mechanism extending from said end of said mast in said pit in position to engage said component assembly, and with said camera in a position where it picks up a view of a portion of the surface of said component assembly with reference to which surface the mechanism is to be positioned to engage said component assembly appropriately for raising and lowering, connecting said camera to said monitor in view communication relationship to produce on said monitor an image of said portion of said surface, and while viewing said image moving said mechanism and the camera movable therewith relative to said surface to align said image with said reference indication to set said mechanism in a referenced position to be appropriate for engaging said component assembly for raising and lowering.

* * * * *